United States Patent
Barton et al.

(10) Patent No.: US 10,827,453 B2
(45) Date of Patent: Nov. 3, 2020

(54) RANGE DETECTION AND MOTION CAPTURE

(71) Applicant: Disney Enterprises, Inc., Burbank, CA (US)

(72) Inventors: Mark Robert Barton, La Canada Flintridge, CA (US); Michael Paul Goslin, Sherman Oaks, CA (US); Eric C. Haseltine, Silver Springs, MD (US)

(73) Assignee: Disney Enterprises, Inc., Burbank, CA (US)

( * ) Notice: Subject to any disclaimer, the term of this patent is extended or adjusted under 35 U.S.C. 154(b) by 983 days.

(21) Appl. No.: 15/069,714

(22) Filed: Mar. 14, 2016

(65) Prior Publication Data

US 2017/0265160 A1    Sep. 14, 2017

(51) Int. Cl.
*G01C 3/08* (2006.01)
*H04W 64/00* (2009.01)
*H04W 4/80* (2018.01)

(52) U.S. Cl.
CPC .......... *H04W 64/006* (2013.01); *H04W 4/80* (2018.02)

(58) Field of Classification Search
CPC ......... H04W 64/006; H04W 4/80; G01C 3/08
See application file for complete search history.

(56) References Cited

U.S. PATENT DOCUMENTS

| | | | |
|---|---|---|---|
| 4,998,125 A | 3/1991 | Watanabe et al. | |
| 5,081,597 A * | 1/1992 | Kowalski | G06K 15/027 702/85 |
| 5,781,281 A | 7/1998 | Miyano | |
| 7,684,016 B1 * | 3/2010 | Schaefer | G01S 7/491 356/4.01 |
| 8,735,824 B2 | 5/2014 | Hong et al. | |
| 2014/0207517 A1 * | 7/2014 | Oshima | H04N 5/2356 705/7.29 |

* cited by examiner

*Primary Examiner* — Samantha K Abraham
(74) *Attorney, Agent, or Firm* — Patterson + Sheridan, LLP

(57) ABSTRACT

Embodiments herein disclose a range detection system that includes a line-of-sight (LOS) emitter that outputs a LOS signal (e.g., visible light, infrared, etc.) which is detected at a receiver (e.g., a photodiode). The receiver outputs a signal representing the intensity of the LOS signal at the receiver. The output signal is converted into a digital signal which is then used to identify a distance value corresponding to the intensity of the LOS signal. For example, the range detection system may include a data structure that maps a plurality of digital signals to respective distance values. In this manner, the intensity of the LOS signal measured at the receiver can be correlated to a distance between the emitter and the receiver.

20 Claims, 4 Drawing Sheets

RANGE DETECTION AND MOTION CAPTURE

BACKGROUND

Field of the Invention

The embodiments herein are generally directed to using light-of-sight signals to perform range detection.

Description of the Related Art

Generally, range detection systems identify the distance between two objects. Range detection may be used in many different systems such radar, motion trackers, video game development, and the like. By determining the distance between objects, systems can perform more complex calculations such as triangulation to determine a 3D location of an object or track an object in free space. However, typical range detection systems are costly and bulky. For example, radar systems require large arrays and expensive computing systems that can perform complex calculations. Thus, in low cost scenarios, the cost and weight of many range detection systems may make these systems impractical.

SUMMARY

One embodiment described herein is a method that includes receiving, at a line-of-sight (LOS) receiver, a LOS signal outputted by a separate LOS emitter and generating a value representing an intensity of the received LOS signal. The method includes processing the value using a predefined relationship to determine a separation distance between the LOS receiver and the LOS emitter, where the predefined relationship is derived using a known output intensity of the LOS emitter when generating the LOS signal.

Another embodiment described herein is a system that includes a LOS receiver configured to receive a LOS signal outputted by a LOS emitter external to the system. The system also includes logic configured to generate a value representing an intensity of the received LOS signal and process the value using a predefined relationship to determine a separation distance between the LOS receiver and the LOS emitter where the predefined relationship is derived using a known output intensity of the LOS emitter when generating the LOS signal.

Another embodiment described herein is a system that includes an emitter light emitting diode (LED) configured to output a LOS signal and a receiver LED configured to receive the LOS signal. The system also includes logic configured to generate a value representing an intensity of the received LOS signal and process the value using a predefined relationship to determine a separation distance between the receiver LED and the emitter LED where the predefined relationship is derived using a known output intensity of the emitter LED when generating the LOS signal.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Range detection over short distances (e.g., less than ten feet) can be performed using inexpensive, lightweight, and small components. The embodiments herein disclose a range detection system that includes a line-of-sight (LOS) emitter that outputs a LOS signal (e.g., visible light, infrared, etc.) which is detected at a receiver (e.g., a photodiode). The receiver generates a signal representing the intensity of the received LOS signal. In one embodiment, this signal is converted into a digital value corresponding to the intensity of the LOS signal; the digital value can then be used to identify a distance value. For example, the range detection system may include a data structure that maps a plurality of digital values to corresponding distance values. In this manner, the intensity of the LOS signal measured at the receiver can be correlated to a distance between the emitter and the receiver.

In one embodiment, the range detection system may be used in a motion tracking system where a user wears multiple emitters that are activated in a predefined sequence. The motion tracking system includes multiple receivers arranged in a fixed spatial relationship—e.g., mounted on a ceiling or wall. By determining the distance between the receivers and an active emitter, the motion tracking system can identify the location of the emitter in 3D space using triangulation, for example. By repeating this process using other emitters worn by the user, the motion tracking system can track the movements of the user in space. The emitters and receivers can be LEDs, detectors (e.g., photodiodes), lasers and the like which reduce the cost and complexity of the motion tracking system relative to a system that uses cameras or depth sensors to track user motion.

Figure 1:
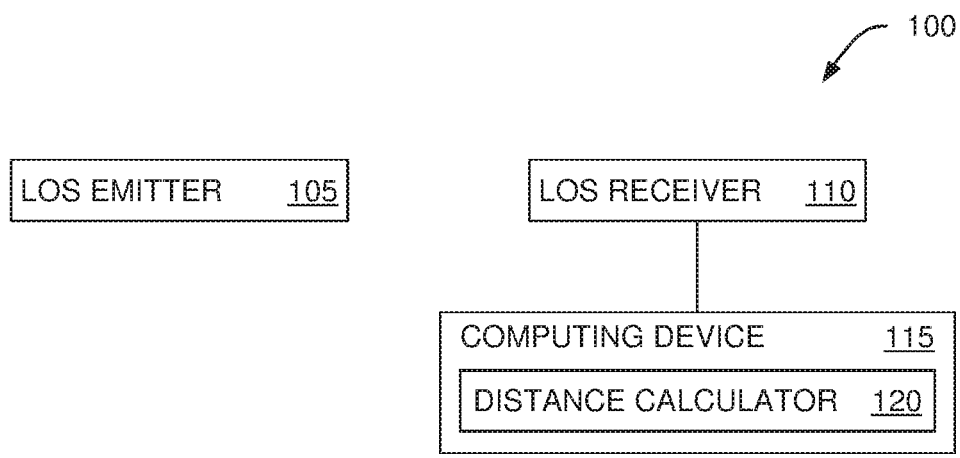
FIG. 1 is a block diagram of a line-of-sight communication system, according to one embodiment described herein.

FIG. 1 is a block diagram of a range detection system 100, according to one embodiment described herein. System 100 includes a LOS emitter 105, a LOS receiver 110 and a computing device 115. As used herein, a LOS signal refers to any electromagnetic signal that is reflected or absorbed by solid, opaque objects. Examples of LOS signals include ultraviolet, visible light, and infrared. In contrast, x-rays, radar, AM and FM radio waves are not examples of LOS signals since these signals penetrate opaque (nonconductive) objects. The LOS emitter 105 may be any source capable of emitting LOS signals such as a laser, light emitting diode (LED), and the like. The LOS receiver 110 may be any detector capable of detecting LOS signals. For example, the LOS receiver 110 may be a photodiode or a LED. For instance, reverse biasing an LED causes a PN junction in the LED to form a depletion region for detecting the LOS signals emitted by the LOS emitter 105. Thus, LEDs may be used for both the emitter 105 and the receiver 110. When used as an emitter 105, an LED is forward biased, but when used as a receiver 110, an LED is reverse biased.

As shown, the LOS emitter 105 is separate from the LOS receiver 110. For example, the LOS emitter 105 may be disposed on a separate device than the LOS receiver 110. As such, the LOS emitter 105 and receiver 110 can receive signals directly—i.e., without reflections—unlike a camera that includes both an IR emitter and receiver for determining distances to objects within its view. In one embodiment, the LOS emitter 105 is disposed on a device that is external to a device or system containing the LOS receiver 110.

The LOS receiver 110 is communicatively coupled to the computing device 115 which includes a distance calculator 120 for determining (or estimating) the distance between the LOS emitter 105 and LOS receiver 110. When detecting the LOS signal, the LOS receiver 110 generates an electrical signal that is transmitted to the computing device 115. Stated differently, the LOS receiver 110 converts the optical LOS signal into an electrical signal which is then processed by the computing device 115.

The distance calculator 120 may be hardware, firmware, or software in the computing device 115. In scaled-down embodiments, the distance calculator 120 may be implemented using logic in an ASIC or microprocessor. In more complex computing devices 115, the distance calculator 120 may be a software application running on an operating system executing in the computing device 115. Generally, the distance calculator 120 identifies a distance value that corresponds to the intensity of the LOS signal measured at the receiver 110. In one embodiment, the distance calculator 120 uses a predefined relationship that maps different intensity levels measured by the receiver 110 to corresponding distances between the emitter 105 and receiver 110. Generally, as the measured intensity increases, the distance calculator 120 determines that the separation distance between the LOS emitter 105 and LOS receiver 110 is decreasing. As the separation distance increases, the intensity decreases. In one embodiment, when LEDs are used as the LOS emitter 105 and receiver 110, the distance calculator 120 can accurately estimate the distance between the emitter 105 and receiver 110 (i.e., within a few inches) for up to 5-10 feet of separation. However, if more powerful LOS emitters 105 are used such as IR or visible light lasers, the distance calculator 120 may be able to accurately measure the separation distance between the emitter 105 and receiver 110 for distances greater than 10 feet. One advantage of using LEDs as the LOS emitter 105 and LOS receiver 110 is that LEDs are less expensive than lasers or other more powerful emitters.

In one embodiment, the LOS emitter 105 may be an IR emitter (e.g., an IR LED or laser) while the LOS receiver 110 is an IR photodiode. The LOS emitter 105 may output a pulsed signal (i.e., a modulated signal) or a constant signal. Moreover, the output signal may contain data, but this is not necessary. For example, even if the LOS emitter 105 outputs a modulated signal that includes data, the LOS receiver 110 or computing device 115 may generate a signal that represent the average intensity of the signal outputted by the LOS emitter 105. The distance calculator 120 may use the average intensity (rather than the instantaneous intensity) of the modulated signal to determine the distance between the emitter 105 and receiver 110.

In one embodiment, the LOS emitter 105 and the LOS receiver 110 may switch roles. For example, at time A, an LED in the emitter 105 may be forward biased such the IR signals are emitted towards a reverse biased IR LED in the receiver 110. As mentioned above, the computing device 115 uses the signals to determine a distance between the emitter 105 and receiver 110. At time B, however, the LED in the emitter 105 may be reversed biased thereby turning the emitter 105 into a receiver, while the LED in the receiver 110 is forward biased turning the receiver 110 into a transmitter. Although not shown, the LOS emitter 105 may be coupled to a computing device 115 so that LOS signals received from the forward biased LED in the receiver 110 can be processed to determine the separation distance between the emitter 105 and receiver 110. For example, the emitter 105 and receiver 110 may be located on two different toys. At time A, the toy containing the receiver 110 can determine the distance between the toys. At time B, the roles are reversed so that the toy containing the emitter 105 (now functioning as a receiver) can detect signals emitted by the LED in the receiver 110 and determine a distance between the toys. In this manner, both toys can determine the separation distance at two different times. This process may be performed either synchronously (e.g., using a control signal) or asynchronously (e.g., an ad hoc system).

Figure 2:
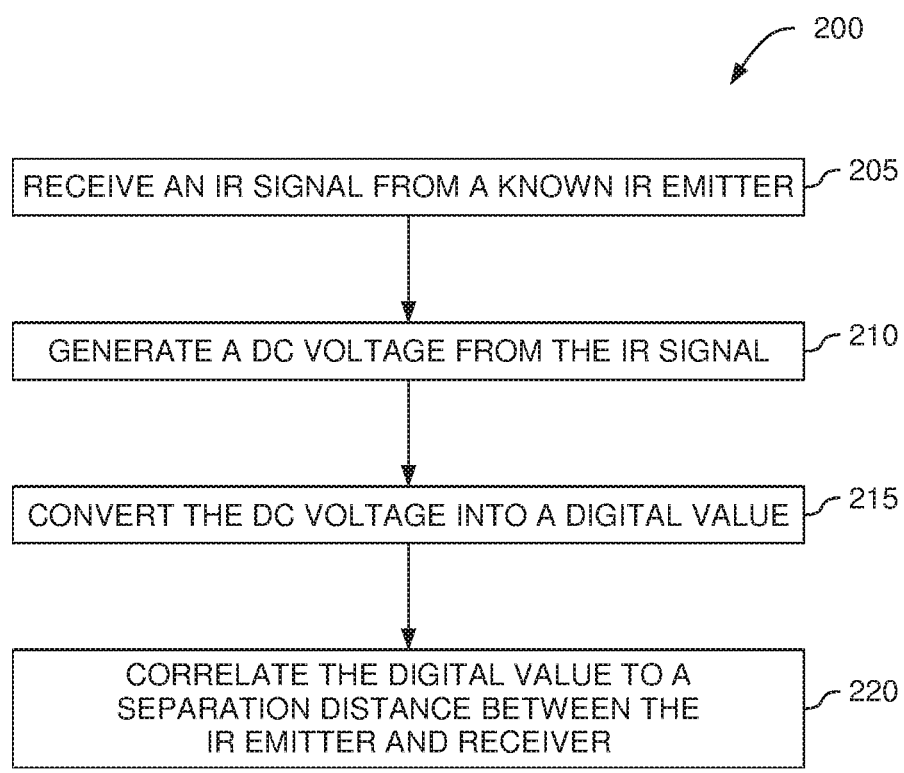
FIG. 2 is a flowchart of performing infrared range detection, according to one embodiment described herein.

FIG. 2 is a flowchart of a method 200 for performing range detection, according to one embodiment described herein. For clarity, the different blocks in method 200 are discussed in tandem with FIG. 3A which is a block diagram of an infrared communication system 300. Moreover, although the embodiments that follow discuss using an IR signal, the same techniques apply to other LOS signals.

At block 205, an IR receiver 110 receives an IR signal 301 from a known IR emitter. As used herein, a "known" emitter means the distance calculator 120 knows the intensity of the signal outputted by the emitter. In the case the IR emitter outputs a modulated signal, the distance calculator knows the average intensity of the signals outputted by the emitter (assuming this average remains constant). The intensity of the IR emitter may be measured in output power or luminance. For example, the distance calculator 120 may know that the IR emitter (e.g., an IR LED) has a 1 mW output power. Thus, if the IR system 300 measures 1 mW of power, then the distance calculator 120 knows the IR emitter is right next to the IR receiver 305. However, as the separation distance between the emitter and receiver 305 increases, the amount of power or luminance measured by the system 300 decreases as described below. So long as the output intensity of the IR emitter is known, the system 300 can correlate the measured intensity of the IR signal 301 to a separation distance between the emitter and receiver 305.

In one embodiment, IR or ultraviolet signals may be preferred over visible light signals since there may be less interference from other sources, especially indoors. For example, while the indoors typically include many sources of ambient visible light (e.g., lights in a house), there are relatively fewer sources of IR signals. As such, when IR signals 301 are received, the IR system 300 may assume these signals were outputted from a known IR emitter.

In one embodiment, the IR emitter may be disposed in a first toy device while the IR system 300 is disposed in a second toy device. Rather than assuming any received IR signals originate from the IR emitter in the first toy, the toys may include a separate communication system that uses, e.g., radio waves to communicate. Using the separate communication system, the first toy can emit a data packet indicating to the second toy device that the IR emitter is outputting a signal. In response, the IR system 300 in the second toy device may activate the IR receiver 305 to detect the light. However, using a separate communication system may increase the costs of the toy device relative to assuming that any received IR signals are from a known IR emitter.

In another embodiment, the IR system 300 determines if the IR signals 301 are outputted by a known IR emitter by evaluating modulated data in the IR signals 301. For example, the IR emitter may encode an ID or key into the IR signals 301 which the IR system 300 identifies by demodulating the IR signals 301. If the ID matches a stored ID, the IR system 300 determines the IR signals are outputted from a known IR emitter. Moreover, in another embodiment, the IR emitter may encode its output intensity into the IR signals 301. Before receiving the IR signals 301, the output intensity of the IR emitter may be unknown to the IR system 300. However, once the IR system 300 decodes the IR signal 301 and identifies data indicating the output intensity of the IR emitter, the emitter is now known to the IR system 300. As a result, the distance calculator 120 can determine the distance between the receiver 305 and emitter by comparing the output intensity of the emitter to the intensity actually measured at the IR system 300 as described below.

At block 210, a photodiode 310 on the IR receiver 305 generates a DC voltage from the IR signal 301. For example, the materials of the photodiode 310 may be selected so that the photodiode 310 is sensitive to the wavelength(s) of the IR signal 301. If other types of LOS signals are used, the materials of the photodiode 310 may need to change so that the diode 310 is sensitive to the wavelength of the corresponding LOS signal.

In one embodiment, the speed at which the IR receiver 305 detects the IR signals 301 (e.g., the time constant of the photodiode 310) means the DC voltage outputted by the receiver 305 represents the average intensity of the IR signal rather than the instantaneous intensity. For example, the IR signal may be modulated at a rate of 1 Mhz to 1 GHz but the photodiode 310 may operate at a frequency less than 100 KHz. As a result, the DC voltage generated by the photodiode 310 represents the average of multiple cycles of the modulated signal. For example, although the IR signal may cycle between a HIGH state to a LOW state every millionth of a second, the photodiode 310 may sample every thousandth of a second. Thus, the DC voltage of the IR receiver 305 may represent an intermediate (average) state between the HIGH and LOW states of the modulated IR signal.

In other embodiments, the IR receiver 305 may sample the IR signal 301 at the same or similar rate as the data in the signal 301 is modulated. In this scenario, the IR system may include an averaging circuit that averages the samples—e.g., maintains a running average—in order to generate a DC voltage that changes as the average intensity of the modulated signal changes. Of course, if the IR signal 301 is not modulated, then the IR system 300 does not need to average the signals generated by the receiver 305.

The IR system 300 includes a pre-amp 315 and rectifier 320 for buffering and processing the DC voltage outputted by the IR receiver 305. For example, the pre-amp 315 and rectifier 320 may buffer the DC voltage, filter out noise, or increase the amplitude of the signals generated by the IR receiver 305.

At block 215, an analog to digital (A/D) converter 325 converts the DC voltage into a digital value. More generally, the A/D converter 325 is configured to convert a range of DC voltages to corresponding discrete digital values. That is, the A/D converter 325 converts an analog signal generated by the photodiode 310 (and processed by the pre-amp 315 and rectifier 320) into a digital value that is processed by a microprocessor 330. In one embodiment, although shown as being separate from the microprocessor 330, the A/D converter 325 may be integrated into the microprocessor 330. The pre-amp 315, rectifier 320, A/D converter 325, and microprocessor 330 are referred to generally herein as logic. Although hardware elements are shown, the logic may also include software or firmware or a combination thereof rather than only hardware logic.

Figure 3A:
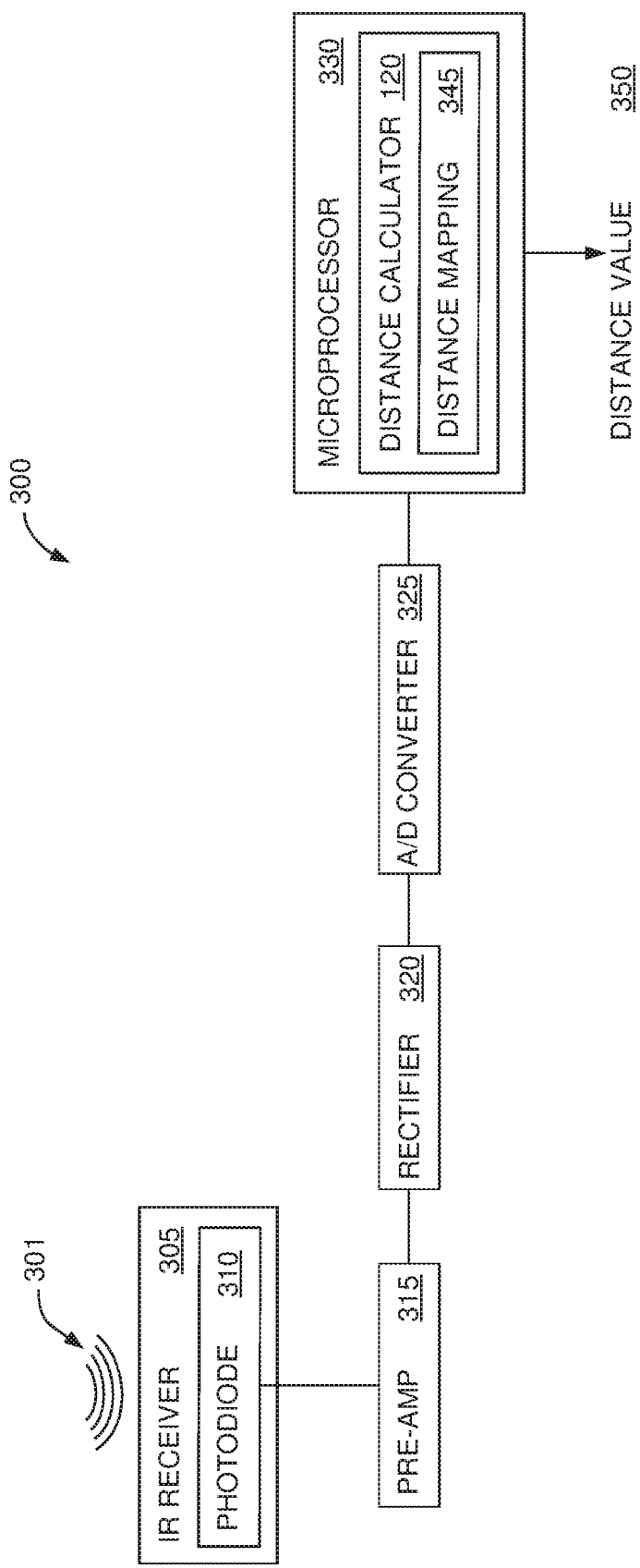
FIG. 3A is a block diagram of an infrared communication system, according to one embodiment described herein.

At block 220, the distance calculator 120 correlates the digital value to a separation distance between the IR emitter and IR receiver 305. As shown in FIG. 3A, the distance calculator 120 includes a distance mapping 345 which maps digital values outputted by the A/D converter 325 to distance values 350. In one embodiment, the distance mapping 345 is a data structure such as a table or database. The distance calculator 120 uses the digital value to index into the data structure and identify the associated distance value. For example, as the DC voltage measured by the photodiode 310 increases, the digital value generated by the A/D converter 325 may also increase. In the distance mapping 345, larger digital values correspond to smaller distance values 350. Put differently, larger distance values (which correspond to greater measured intensity values) are mapped to small distance value 350. Conversely, when the IR emitter and receiver 305 move farther apart, the digital values decreases. The distance mapping 345 is configured such that as the digital value decreases the corresponding distance values 350 increase. In this manner, method 200 uses measured intensity of IR signals 301 to generate a distance value 350 indicating the separation distance between the emitter and receiver 305.

In one embodiment, the distance mapping 345 is defined before the IR signals 301 are received by the IR system 300. For example, the mappings between possible digital values and corresponding distance values 350 may be stored in the distance mapping 345 before a device (e.g., a toy) containing the IR system 300 is sold to a customer. Thus, when the device is activated and IR signals 301 are received, the IR system 300 is ready to map digital values to distance values 350 using the information stored in the distance mapping 345.

In another embodiment, the distance mapping 345 is populated using a configuration stage. The IR system 300 may use an output device to instruct the user to move the IR emitter different distances from the IR receiver 305—e.g., move the IR emitter six inches, then 1 feet, and then 2 feet from the IR receiver 305. As the user confirms the IR emitter and IR receiver are at the requested separation distances, the distance calculator 120 stores the digital value generated at that distance. Thus, when that same digital value is measured later, the corresponding distance value 350 can be outputted by the distance mapping 345. Moreover, the distance calculator 120 may interpolate other mappings to populate other entries in the distance mapping 345. For example, the IR system 300 may request the user move the IR emitter and receiver 305 such that they are spaced apart by 1 foot, then 2 feet, and then 3 feet. Based on the digital values measured at these points, the distance calculator 120 can interpolate the digital values at other distances such as 1.5 feet, 2.75 feet, etc. without asking the user to separate the IR emitter and IR receiver by these distances.

In one embodiment, the distance calculator 120 includes distance mappings 345 for different kinds of IR emitters. As described above, different IR emitters output signals at different intensities. For example, a laser emits much higher intensity signals than an LED. Thus, digital values measured when a laser is used should correspond to different distance values 350 than when the same digital values are measured when an LED is the IR emitter. Using data in the IR signals such as a key or ID, the IR system 300 may identify which type of IR emitter is outputting the IR signals 301 and select one of the distance mappings 345 stored in the distance calculator 120 to use when generating the distance value 350.

In one embodiment, instead of using the distance mapping 345, the distance calculator 120 may use an algorithm based on a mathematical formula corresponding to the known emitter to determine the separation distance. Using the digital value as an input, the mathematical formula outputs the corresponding separation distance. For example, each known emitter (e.g., an IR laser or IR LED) may correspond to a unique formula. One example of a linear mathematical formula could be $D=C \times I$. Here, D is the separation distance between the emitter and receiver, I is the digital value representing the intensity of the received signal, and C is a constant derived from the output intensity of the known emitter. In this example, the values of I may range from 0 to 1 where 0 represents signals with the greatest intensity and 1 represents signals with the least intensity. Thus, if C is the maximum distance that the receiver can detect the emitter (e.g., five feet), then as I increases—i.e., the intensity of the received signal decreases—the distance (D) between the emitter and receiver increases—e.g., when I is 1, D is 5 feet. The reverse is also true so that when I decreases the distance value D decreases—e.g., when I is 0.1, D is 0.5 feet. In this manner, the distance calculator 120 can use the mathematical formula to calculate the current distance between the IR receiver and emitter.

Generally, the distance calculator 120 processes the digital value to determine the separation distance between the emitter and receiver using a predefined relationship that is derived from the known output intensity of the LOS emitter when generating the LOS signals. As used herein, a predefined relationship can include a data structure, such as a table or database, or an algorithm based on a mathematical formula as described above.

Figure 3B:
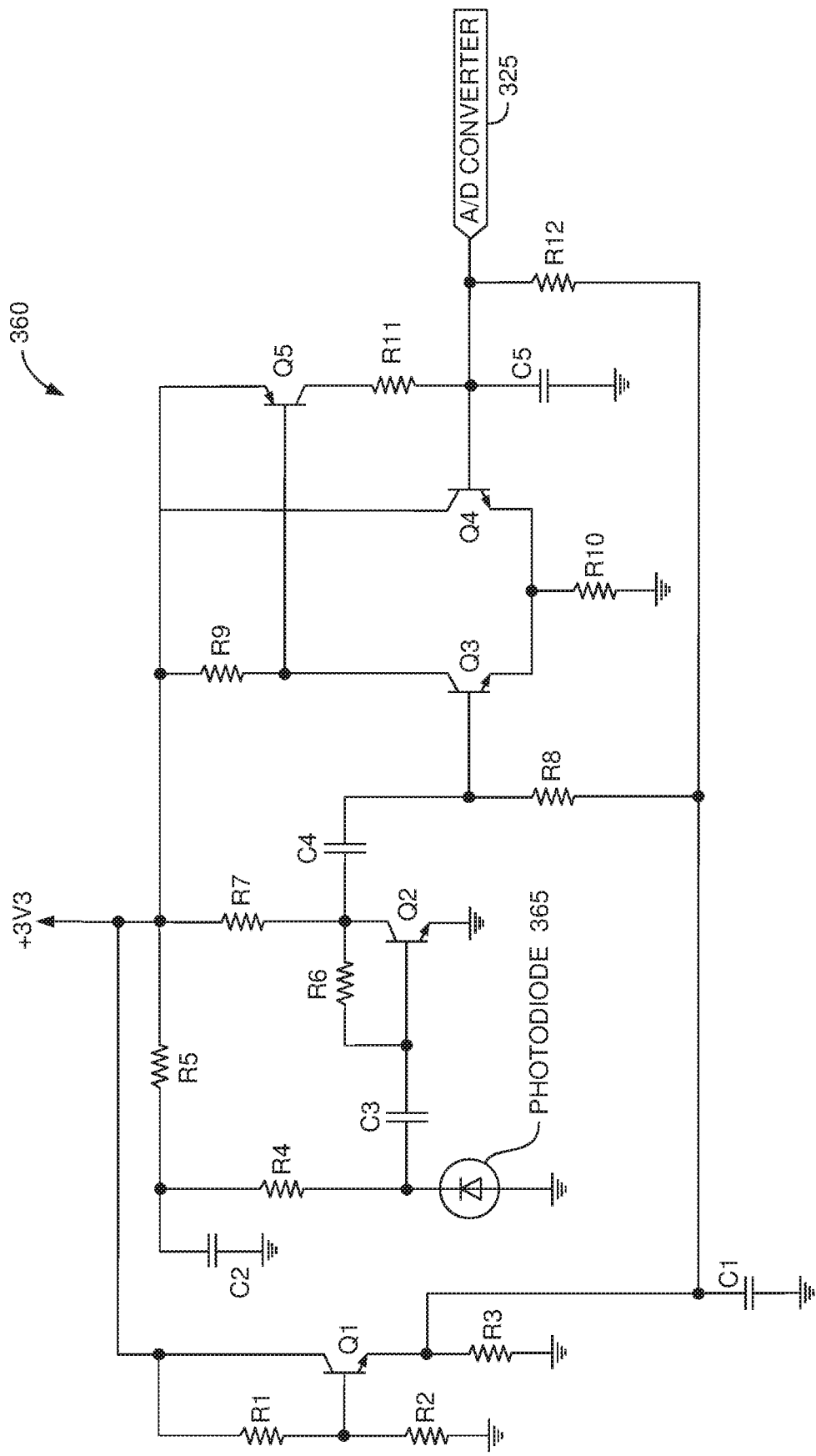
FIG. 3B is a circuit diagram of a pre-amplifier and rectifier of an infrared communication system, according to one embodiment described herein.

FIG. 3B is a circuit diagram 360 of the pre-amplifier 315 and the rectifier 320 of an infrared communication system, according to one embodiment described herein. The circuit 360 includes a photodiode 365 which, in one embodiment, receives a modulated infrared signal. The photodiode 365 is AC coupled by a capacitor $C_3$ to transistor $Q_2$ which serves as the pre-amp 315 and amplifies the electrical signal generated by the photodiode 365 in response to the received infrared signal. The resistor $R_5$ and capacitor $C_2$ form a low-pass filter to provide a low noise bias source through resistor $R_4$ for the photodiode 365. The transistors $Q_3$, $Q_4$, and $Q_5$ form a part of an operation amplifier (opamp) in the rectifier 320. Unlike typical opamps which have a complementary push-pull output stage, the opamp formed by transistors $Q_3$, $Q_4$, and $Q_5$ provides amplification and precision rectification by providing a transistor—i.e., transistor $Q_5$—to only push a positive output but nothing to pull a negative output. As a result, the differential amplifier formed by transistors $Q_3$ and $Q_4$ is balanced when transistor $Q_5$ charges capacitor $C_5$ to a DC voltage representing the peaks of the amplified waveform.

The resistors $R_1$, $R_2$, and $R_3$ along with the transistor $Q_1$ and capacitor $C_1$ form a buffered mid-supply source which serves as a signal ground reference. When no infrared signal is received, the output of the circuit 360 (which is the input to the A/D converter 325) remains at the signal ground reference voltage. The A/D converter 325 (e.g., an A/D input of a microprocessor) receives the signal ground reference which is used as a baseline to compare subsequent readings when the photodiode 365 does receive infrared signals. In one embodiment, positive deviations from the baseline value indicate an incoming infrared signal.

Figure 4:
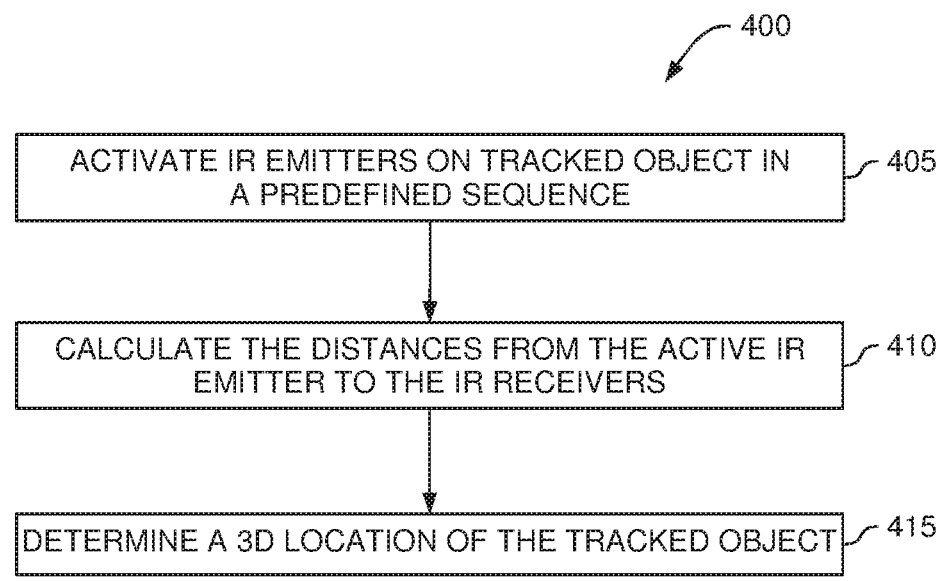
FIG. 4 is a flowchart of performing motion capture using line-of-sight signals, according to one embodiment described herein.
Figure 5:
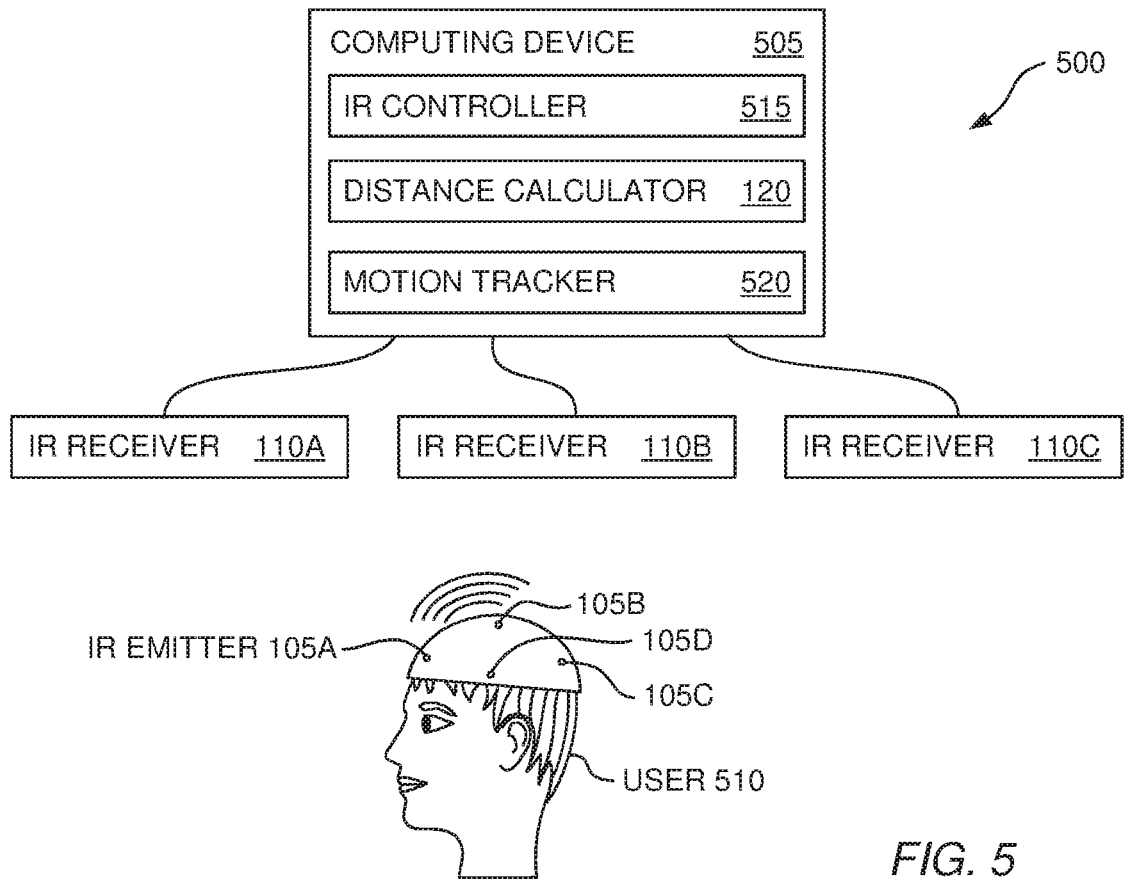
FIG. 5 is a block diagram of a motion capture system, according to one embodiment described herein.

FIG. 4 is a flowchart of a method 400 for performing motion capture using LEDs, according to one embodiment described herein. For clarity, the different blocks in method 400 are discussed in tandem with FIG. 5 which is a block diagram of a motion capture system 500. Moreover, although the embodiments that follow discuss using an IR signal, the same techniques apply to other LOS signals.

At block 405, IR emitters 105 are activated on a tracked object (e.g., user 510) in a predefined sequence. For example, at Time A, IR emitter 105B outputs an IR signal which is detected at one or more of the IR receivers 110. At Time B, IR emitter 105B ceases outputting an IR signal and IR emitter 105C outputs an IR signal that is detected by the IR receivers 110. In one embodiment, only one of the IR emitters 105 outputs a signal at any given time.

The sequence at which the IR emitters 105 are activated and deactivate may be predefined. Moreover, the IR emitters may be synchronized with computing device 505. To do so, computing device 505 includes an IR controller 515 which activates and deactivates the IR emitters 105. As such, the computing device 505 knows which one of the IR emitters 105 is currently active. Thus, if any of the IR receivers 110 detect an IR signal, the computing device 505 knows this signal originated from the IR emitter 105 that is currently active—e.g., emitter 105B which is disposed near the top of the user's head 510. Similarly, if emitter 105C is the only emitter active, then the computing device 505 knows any IR signals detected by the IR receivers 110 result from the emitter near the back of the user's head 510.

In one embodiment, instead of the IR controller 515 activating and deactivating the emitters 105, the computing device 505 may determine which of the emitters 105 is active depending on an ID or key encoded in the IR signals received. For example, each of the emitters 105 may transmit a unique ID when outputting IR signals. By identifying the particular ID being transmitted, the computing device 505 can determine which of the emitters 105 is currently transmitting. In this scenario, the activation and deactivation of the IR emitters 105 may be controlled by a controller separate from the computing device 505, but the computing device 505 can nonetheless be synchronized to the emitters 105 using the IDs transmitted by the emitters 105.

At block 410, the distance calculator 120 determines the distance between the IR receivers 110 and the IR emitter 105 currently transmitting IR signals. As described in method 200, each IR receiver 110 that detects the IR signal generates a DC voltage which is converted into a digital value. The distance calculator 120 receives the digital values from each of the IR receivers 110 and determines the corresponding distance values. For example, assuming all the receivers 110 are within LOS of the active emitter 105B, the distance calculator 120 determines the separation distances between each of the receivers 110A, 110B, and 110C and the active emitter 105B. Thus, each time an emitter 105 is active, the distance calculator 120 determines a distance value for each of the receivers 110, assuming the receivers 110 are not occluded.

At block 415, a motion tracker 520 determines a 3D location of the tracked object. For example, the motion tracker 520 may use the distance values determined at block 410 to triangulate the location of the active IR emitter 105B on the user 510. Because relative positions between the IR receivers 110 are known, the motion tracker 520 can use the distance values to determine where the IR emitter 105B is located in 3D space. For example, the IR receivers 110 may be located at fixed positions on the ceiling above the user 510. Although not shown, IR receivers 110 may also be located in front of, behind, or to the side of the user 510. Identifying the distance between the active emitter 105B and multiple IR receivers 110 (preferably more than three), the motion tracker 520 identifies a location of the active emitter 105 in free space. Moreover, in another embodiment, the IR receivers 110 can be mounted on a moving platform such as a moveable fixture or a drone. Although the platform is mobile in free space, the relative positions of the IR receivers 110 on the platform are fixed. To determine the absolute and relative positions of the IR receivers 110, the platform may include GPS or other location detection systems to enable the motion tracker 520 to identify the locations of the IR receivers 110.

Blocks 410 and 415 of method 400 may repeat as different IR emitters 105 are activated. For example, the IR controller 515 may turn off emitter 105B and activate emitter 105D according to the predefined pattern. Using the measurements captured by the IR receivers 110, the distance calculator 120 determines the distances between each of the receivers 110 and the active emitter 105D. The motion tracker 520 identifies a 3D location of the active emitter 105D using the distance values. Moreover, the pattern may repeat at a rate that is sufficient to provide the desired resolution. For example, the pattern may repeat to ensure the motion tracker 520 captures smooth movements made by the user 510 rather than discrete or jerky movements. For example, each of the IR emitters 105 may be active at least once every 10 milliseconds which permits the motion tracker 520 to detect continuous movements made by the user 510.

In one embodiment, the information obtained from the motion tracker 520 is used to animate the user 510 into a video game or movie. In another example, the user's movements captured by the motion tracker 520 can be used to model movements of virtual characters in a video game or animation.

One advantage of system 500 is that the IR emitters 105 and receivers 110 may be made using lasers, photodiodes, LEDs, and the like. Unlike other motion capture systems which rely on expensive high frame rate cameras or depth sensors to capture images of markers worn by the user 510, system 500 can use the distance measurements captured by using, e.g., LEDs and photodiodes to track user movements.

Although motion capture system 500 can operate without these expensive components, in other embodiments, cameras or depths sensors may be combined with the IR receivers 110 in order to capture information about the user 510. For example, using a combination of components such as IR receivers, visible light cameras, and depth sensors may provide better tracking capabilities than when only one type of device is used.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., distance calculator 120) or related data available in the cloud. For example, the distance calculator 120 could execute on a computing system in the cloud to identify the separation distance between the emitter and receiver. In such a case, the distance calculator 120 could use cloud computing resources to store the distance mapping 345 at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving, at a line-of-sight (LOS) receiver, a LOS signal outputted by a LOS emitter separate from the LOS receiver, wherein a spatial relationship between the LOS receiver and emitter can fluctuate;
generating a value representing an intensity of the received LOS signal; and
processing, using a distance calculator, the value using a predefined relationship to determine a separation distance between the LOS receiver and the LOS emitter, wherein the predefined relationship is derived using an output intensity of the LOS emitter when generating the LOS signal, wherein the output intensity used by the LOS emitter is known to the distance calculator before the LOS signal is received at the LOS receiver.

2. The method of claim 1, wherein the predefined relationship is one of (i) a data structure mapping a plurality of values representing different intensities of the received LOS signal to a corresponding plurality of separation distances between the LOS receiver and the LOS emitter and (ii) an algorithm based on a mathematical formula.

3. The method of claim 1, wherein the LOS receiver comprises a photodiode, and wherein processing the value comprises:
generating a DC voltage representing the intensity of the received LOS signal using the photodiode; and
converting the DC voltage to a digital value using an analog to digital converter.

4. The method of claim 1, wherein the LOS receiver comprises a light emitting diode (LED) for receiving the LOS signal.

5. The method of claim 4, wherein the LOS signal comprises infrared signals that are detected by the LED, and wherein the value represents an intensity of the infrared signals.

6. The method of claim 4, wherein the LOS emitter comprises an LED for outputting the LOS signal.

7. The method of claim 6, further comprising:
identifying a 3D location of the LOS emitter by processing the respective distances; and
tracking a motion of the LOS emitter in space using the 3D location.

8. The method of claim 1, further comprising:
simultaneously receiving the LOS signal emitted by the LOS emitter at a plurality of LOS receivers;
generating respective values representing the intensity of the LOS signal at each of the plurality of LOS receivers; and
determining respective distances between each of the plurality of LOS receivers and the LOS emitter based on the respective values.

9. A system, comprising:
a line-of-sight (LOS) receiver configured to receive a LOS signal outputted by a LOS emitter external to the system, wherein a spatial relationship between the LOS receiver and emitter can fluctuate;
logic configured to:
generate a value representing an intensity of the received LOS signal; and
process the value using a predefined relationship to determine a separation distance between the LOS receiver and the LOS emitter, wherein the predefined relationship is derived using an output intensity of the LOS emitter when generating the LOS signal, wherein the output intensity of the LOS emitter is known to the logic before the LOS signal is received at the LOS receiver.

10. The system of claim 9, wherein the predefined relationship is one of (i) a data structure mapping a plurality of values representing different intensities of the received LOS signal to a corresponding plurality of separation distances between the LOS receiver and the LOS emitter and (ii) an algorithm based on a mathematical formula.

11. The system of claim 9, wherein the LOS receiver comprises a photodiode, and wherein processing the value comprises logic configured to:
generate a DC voltage representing the intensity of the received LOS signal using the photodiode; and
convert the DC voltage to a digital value using an analog to digital converter.

12. The system of claim 9, wherein the LOS receiver comprises a light emitting diode (LED) configured to receive the LOS signal.

13. The system of claim 12, wherein the LOS signal comprises infrared signals that are detected by the LED, and wherein the value represents an intensity of the infrared signals.

14. The system of claim 9, further comprising:
a plurality of LOS receiver configured to simultaneously receive the LOS signal,
wherein the logic is configured to:
generate respective values representing the intensity of the LOS signal at each of the LOS receivers; and
determine respective distances between each of the LOS receivers and the LOS emitter based on the respective values.

15. The system of claim 14, wherein the logic is configured to:
identify a 3D location of the LOS emitter by processing the respective distances; and
track a motion of the LOS emitter in space using the 3D location.

16. A system, comprising:
an emitter light emitting diode (LED) configured to output a line-of-sight (LOS) signal;
a receiver LED configured to receive the LOS signal, wherein a spatial relationship between the receiver LED and the emitter LED can fluctuate;
logic configured to:
generate a value representing an intensity of the received LOS signal; and
process the value using a predefined relationship to determine a separation distance between the receiver LED and the emitter LED, wherein the predefined relationship is derived using an output intensity of the emitter LED when generating the LOS signal, wherein the output intensity used by the emitter LED when generating the LOS signal is known to the logic before the LOS signal is received at the receiver LED.

17. The system of claim 16, wherein the emitter LED is configured to output an infrared signal as the LOS signal.

18. The system of claim 16, further comprising:
a first toy device comprising the emitter LED; and
a second toy device comprising the receiver LED and the logic.

19. The system of claim 16, further comprising:
a plurality of emitter LEDs;
a plurality of receiver LEDs; and
an controller configured to activate the plurality of emitter LEDs in a predefined pattern, and wherein the logic is configured to:
generate respective values representing the intensity of the LOS signal at each of the plurality of receiver LEDs; and
determine respective distances between each of the plurality of receiver LEDs and an active emitter LED of the plurality of emitter LEDs based on the respective values.

20. The system of claim 19, wherein the logic is configured to:
identify a 3D location of the active emitter LED by processing the respective distances; and
track a motion of the active emitter LED in space using the 3D location.

* * * * *